(12) United States Patent
Kwon et al.

(10) Patent No.: US 8,939,630 B2
(45) Date of Patent: Jan. 27, 2015

(54) BACKLIGHT ASSEMBLY AND DISPLAY APPARATUS HAVING THE SAME

(75) Inventors: Jin-Mo Kwon, Seoul (KR); Dong-Sung Im, Asan-si (KR); Jae-Kook Kim, Asan-si (KR); Geun-kyu Song, Cheonan-si (KR); Seok-Kun Yoon, Seoul (KR); Yong-Hwan Kim, Busan (KR); Doo-Sub Choi, Cheonan-si (KR); Jang-Mi Lee, Busan (KR); Jong-Hyun Sim, Busan (KR)

(73) Assignee: Samsung Display Co., Ltd. (KR)

( * ) Notice: Subject to any disclaimer, the term of this patent is extended or adjusted under 35 U.S.C. 154(b) by 301 days.

(21) Appl. No.: 13/436,522

(22) Filed: Mar. 30, 2012

(65) Prior Publication Data

US 2012/0287666 A1    Nov. 15, 2012

(30) Foreign Application Priority Data

May 12, 2011  (KR) .................. 10-2011-0044545

(51) Int. Cl.
  *G09F 13/04*  (2006.01)
  *F21V 8/00*  (2006.01)
  *G02F 1/1335*  (2006.01)
(52) U.S. Cl.
  CPC ........ *G02F 1/133615* (2013.01); *G02B 6/0091* (2013.01); *G02B 6/0068* (2013.01); *G02B 6/0073* (2013.01); *G02B 6/009* (2013.01)
  USPC .......................................... 362/602; 362/613
(58) Field of Classification Search
  None
  See application file for complete search history.

(56) References Cited

U.S. PATENT DOCUMENTS

| 2011/0273907 A1* | 11/2011 | Iwasaki ........................ 362/607 |
| 2012/0188485 A1* | 7/2012 | Cheon ............................. 349/65 |
| 2012/0250351 A1* | 10/2012 | Shin et al. ..................... 362/608 |
| 2013/0044516 A1* | 2/2013 | Yu ................................. 362/612 |

FOREIGN PATENT DOCUMENTS

| JP | 2008-129200 A | 6/2008 |
| JP | 2009-042360 A | 2/2009 |
| KR | 100474518 B1 | 2/2005 |
| KR | 0949489 B1 | 3/2010 |

* cited by examiner

*Primary Examiner* — Ashok Patel
(74) *Attorney, Agent, or Firm* — Innovation Counsel LLP (57) ABSTRACT

A backlight assembly includes a light guide plate, a light source module spaced apart by a gap from the guide plate, a receiving container and a gap adjusting element. The gap adjusting element is inter-coupled between the receiving container and the light source module and is actuatable to adjust the gap distance between the light source module and the light guide plate. Accordingly, a display quality may be prevented from being decreased, and the productivity may be enhanced.

15 Claims, 6 Drawing Sheets

BACKLIGHT ASSEMBLY AND DISPLAY APPARATUS HAVING THE SAME

CROSS REFERENCE TO RELATED APPLICATION

This application claims priority under 35 U.S.C. §119 to Korean Patent Application No. 10-2011-0044545, filed on May 12, 2011 in the Korean Intellectual Property Office (KIPO), the contents of which application are herein incorporated by reference in their entireties.

BACKGROUND

1. Field of Disclosure

Example embodiments in accordance with the present disclosure of invention relate to a backlight assembly and display apparatus having the backlight assembly. More particularly, they relate to a backlight assembly structured for enhancing light efficiency and uniformly maintaining display luminance and to a display apparatus having the backlight assembly.

2. Description of Related Technology

A liquid crystal display (LCD) apparatus is normally used as an image forming device in a computer or TV monitor, a laptop, a cellular phone, etc, because of its relative thinness and low power consumption as compared to other display devices. The LCD apparatus typically includes an LCD panel structured for displaying an image using a light transmittance of a liquid crystal material, and a backlight assembly disposed under the LCD panel to provide the LCD panel with a source of backlighting.

The backlight assembly may be classified as an edge-illumination type or a direct-illumination type according to a position of a light source. In the edge-illumination type, the light source (e.g., LEDs) is disposed adjacent to a side surface of a light guide plate, where the latter is used to guide light from a side-illumination orientation to an upwardly illuminating orientation.

If the light source makes direct contact with the light guide plate, the light guide plate (e.g., one made of heat deformable materials) may be damaged due to heat generated from the light source. In addition, since coefficients of thermal expansion (COTEs) of a plastic normally used for the light guide plate, and that of metal normally used for a receiving container are different from each other, the light guide plate may be deformed not only due to heat but also due to COTE-induced strains and entry of humidity or loosening of adhesive member used for fixing the light guide plate. Thus, the light guide plate and the receiving container are typically spaced apart from each other by a proper gap in order to reduce COTE-induced strains.

However, a pre-specified optimal gap between the light guide plate and the receiving container may be not maintained due to tolerance errors normally occurring in manufacturing and assembling the backlight assembly.

Additionally, in the edge-illumination type, variance of the gap between the light guide plate and the receiving container away from the pre-specified optimal gap dimension can decrease display quality of the display apparatus, such as due to a deterioration of net luminance and color uniformity, and thus the productivity of high quality display apparatuses may be decreased.

SUMMARY

Example embodiments in accordance with the present disclosure provide an edge-illumination typed backlight assembly capable of adjusting a gap between a light source and a light guide plate.

Example embodiments also provide a display apparatus having the backlight assembly.

According to an example embodiment, a backlight assembly includes a light guide plate, a light source module spaced apart from the light guide plate by a gap distance, a receiving container and a gap adjusting element. The light guide plate includes an incident surface into which sourced light is incident. The light source module includes a plurality of light sources such as LEDs facing the incident surface of the light guide plate. The receiving container includes a bottom surface and a sidewall extending from the bottom surface to form a receiving space. The receiving space receives the light guide plate and the light source module. The gap adjusting element is operatively intercoupled between the receiving container and the light source module and is actuatable to adjust the gap between the light source module and the light guide plate.

In an example embodiment, the light source module may further include a light source supporting substrate and an extrusion bar. The light source supporting substrate mounts the light sources, and faces the incident surface of the light guide plate. The extrusion bar includes first and second frame sections, the first frame section is formed along a first direction substantially parallel with the bottom surface of the receiving container, and the second frame section extends from the first frame section along a second direction substantially perpendicular to the first direction.

In an example embodiment, the light source supporting substrate may be disposed on the second frame section.

In an example embodiment, a combining groove may be formed on the light source module and a combining hole and a combining hole may be formed through the sidewall of the receiving container. The gap adjusting element may be combined with the combining groove and the combining hole.

In an example embodiment, the light source supporting substrate may be fixed to a first surface of the second frame section, and the combining groove may be formed on a second surface of the second frame section opposite to the first surface of the second frame section, so that the second frame section may move from the sidewall of the receiving container along the first direction by screwed-combination between the gap adjusting element and the combining groove.

In an example embodiment, the light sources and the incident surface of the light guide plate may be spaced apart from each other by a first gap, and the light source module and the sidewall of the receiving container may be spaced apart from each other by a second gap. The first gap may increase as the second gap decreases, and vice versa due to the screwed-combination.

In an example embodiment, a sliding guide bar may be formed on the bottom surface of the receiving container to guide the extrusion bar to move along the first direction. A sliding groove into which the sliding guide bar is inserted, may be formed on the first frame section of the extrusion bar.

In an example embodiment, an upper surface of the sliding guide bar may be larger than a bottom surface of the sliding guide bar. An area of the sliding groove may increase as a depth of the sliding groove increases.

In an example embodiment, each of the sliding guide bar and the sliding groove may be plural along a third direction substantially perpendicular to the first and second directions.

In an example embodiment, the light source supporting substrate and the second frame section may be spaced apart from each other.

In an example embodiment, the second frame section of the extrusion bar may be fixed to the sidewall of the receiving container.

In an example embodiment, a first combining hole may be formed through the sidewall of the receiving container, a second combining hole may be formed through the second frame section of the extrusion bar, and the combining groove may be formed on the light source supporting substrate, so that the gap adjusting element may be combined with the first and second combining holes and the combining groove.

In an example embodiment, the light sources may be fixed to a first surface of the light source supporting substrate, the combining groove may be formed on a second surface of the light source supporting substrate opposite to the first surface of the light source supporting substrate, so that the light source supporting substrate may move from the second frame section of the extrusion bar along the first direction by screwed-combination between the gap adjusting element and the combining groove.

In an example embodiment, the light sources and the incident surface of the light guide plate may be spaced apart from each other by a first gap. The light source supporting substrate and the second frame section of the extrusion bar may be spaced apart from each other by a third gap. The first gap may increase as the third gap decreases, and vice versa due to the screwed-combination.

In an example embodiment, the backlight assembly may further include a self-locking portion fixing the gap adjusting element with the combining groove. The gap adjusting element may penetrate and may be combined with the self-locking portion.

According to another example embodiment, a backlight assembly includes a light guide plate, a light source module, a receiving container and a combining element. The light guide plate includes an incident surface into which a light is incident. The light source module includes a plurality of light sources facing the incident surface of the light guide plate. The receiving container includes a bottom surface and a sidewall extending from the bottom surface to form a receiving space. The receiving space receives the light guide plate and the light source module. The combining element is combined with the bottom surface of the receiving container and the light source module, and adjusts a position of the light source module from the bottom surface of the receiving container to adjust a gap between the light source module and the light guide plate.

In an example embodiment, a penetration line through which the combining element penetrates may be formed through the bottom surface of the receiving container. A combining groove into which the combining element is screwed may be formed on a bottom surface of the light source module corresponding to the bottom surface of the receiving container.

In an example embodiment, the penetration line may have a bar-shape extending along the first direction substantially parallel with the bottom surface of the receiving container, so that the gap between the light source module and the light guide plate may be adjusted according as the combining element moves along the penetration line combined with the light source module.

According to still another example embodiment, a display apparatus includes a display panel and a backlight assembly. The display panel displays an image. The backlight assembly includes a light guide plate, a light source module, a receiving container and a gap adjusting element. The light guide plate includes an incident surface into which a light is incident. The light source module includes a plurality of light sources facing the incident surface of the light guide plate. The receiving container includes a bottom surface and a sidewall extending from the bottom surface to form a receiving space. The receiving space receives the light guide plate and the light source module. The gap adjusting element is combined with the sidewall and the light source module to adjust a gap between the light source module and the light guide plate.

In an example embodiment, the light source module may further include a light source supporting substrate and an extrusion bar. The light source supporting substrate may mount the light sources, and may face the incident surface of the light guide plate. The extrusion bar may include first and second frame sections, the first frame section may be formed along a first direction substantially parallel with the bottom surface of the receiving container, and the second frame section may extend from the first frame section along a second direction substantially perpendicular to the first direction.

According to the example embodiments, even if a preset optimal gap between the light guide plate and the receiving container may not be maintained due to an error occurring in manufacturing and assembling the backlight assembly, the gap may be thereafter re-adjusted using the gap adjusting element. Accordingly, a display quality may be prevented from being decreased due to manufacturing variances, and productivity of units with appropriate gap dimensions may be enhanced.

BRIEF DESCRIPTION OF THE DRAWINGS

The above and other features and advantages of the present disclosure of invention will become more apparent by describing in detailed example embodiments thereof with reference to the accompanying drawings, in which.

DETAILED DESCRIPTION

Hereinafter, example embodiments in accordance with the present disclosure of invention will be explained in detail with reference to the accompanying drawings.

Figure 1:
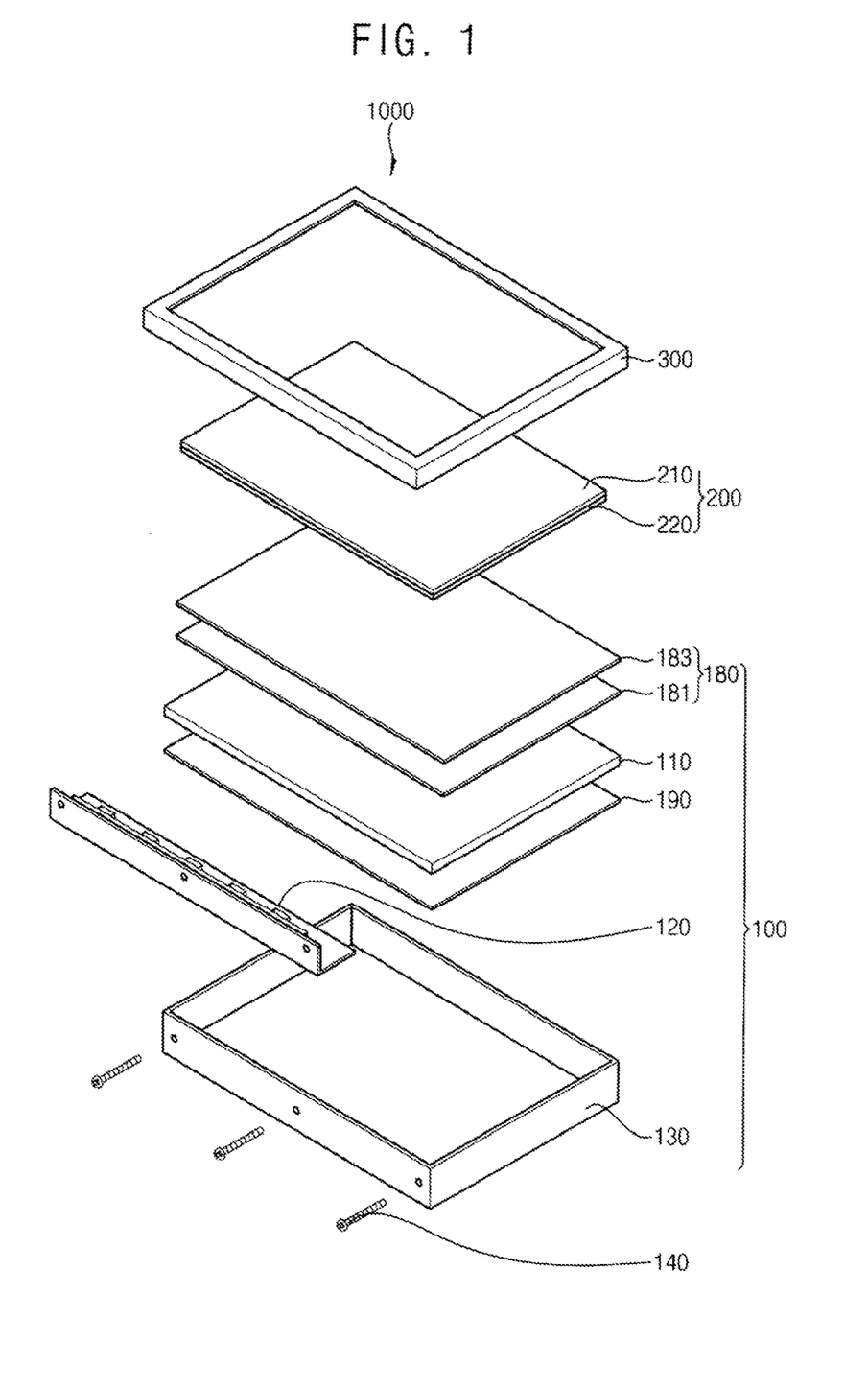
FIG. 1 is an exploded perspective view illustrating a display apparatus according to an example embodiment.

FIG. 1 is an exploded perspective view illustrating a display apparatus according to an example embodiment. Referring to FIG. 1, a display apparatus 1000 according to the present disclosure includes a backlight assembly 100, a display panel 200, and a top chassis 300.

The backlight assembly 100 includes a light guide plate 110, a light source module 120 spaced apart from the light guide plate 110 by one or more gap distances, a bottom chassis 130 and a plurality of gap adjusting elements 140.

The light guide plate 110 functions as a light re-directing channel for emitting light, which is generated from the light source module 120 disposed on one side of the light guide plate 110, upwardly toward the overlying liquid crystal display (LCD) panel 200. When inputted light that is supplied into a side incident surface 111 (sidewall) of the light guide plate 110 reaches a bottom or an upper surface within the light guide plate 110 at an off-normal angle not less than a critical angle, the light is totally reflected and it can thereafter be uniformly re-distributed within an inner space of the light guide plate 110 prior to being re-directed upwardly toward the display panel 300. Here, the light guide plate 110 may be shaped as a plate, and may be formed using a plastic transparent or light-passing material such as an acrylic resin, for example, or a polymethylmethacrylate (PMMA) etc, or using a polycarbonate (PC).

The light source module 120, the bottom chassis 130 and the gap adjusting elements 140 will be explained in yet more detail with reference to FIG. 2 further below.

First however, with reference to FIG. 1, it is seen that the backlight assembly 100 may further include one or more optical sheets 180 and a reflecting sheet 190.

The optical sheet(s) 180 is/are disposed over the light guide plate 110, and enhances an optical characteristic of the light emitted from the light guide plate 110. For example, the optical sheets 180 may include a prism sheet 181 and a diffusion sheet 183. Accordingly the optical sheet 180 may change a direction along which the light is emitted from the light guide plate, such as to a direction substantially perpendicular to the upper major surface of the light guide plate 110, or may spread (e.g., further redistribute) the light, so that a uniformity characteristic of net luminance may be enhanced.

The reflecting sheet 190 is disposed under the light guide plate 110, and back reflects light emitted from the bottom of the light guide plate 110 towards an upper surface of the light guide plate 110.

The display panel 200 includes a bottom substrate 210, an opposing substrate 220 facing the bottom substrate 210, and a liquid crystal material layer interposed between the bottom substrate 210 and the opposing substrate 220. The display panel 200 is structured to displays an image using light provided from the backlight assembly 100 and electrical drive signals supplied thereto from an LCD drive unit (not shown).

The top chassis 300 is disposed over the display panel 200, and is combined with the bottom chassis 130 to secure the display panel 200 and the backlight assembly 100 therebetween.

In addition, the display apparatus 1000 may further include a mold frame (not shown) disposed between the display panel 200 and the backlight assembly 100. The display panel 200 is disposed on a first surface of the mold frame, and the optical sheet(s) 180 and light guide plate 110 are sequentially disposed on a second surface of the mold frame, so that the mold frame may fix a desired distance between the optical sheet(s) 180 and light guide plate 110.

Figure 2:
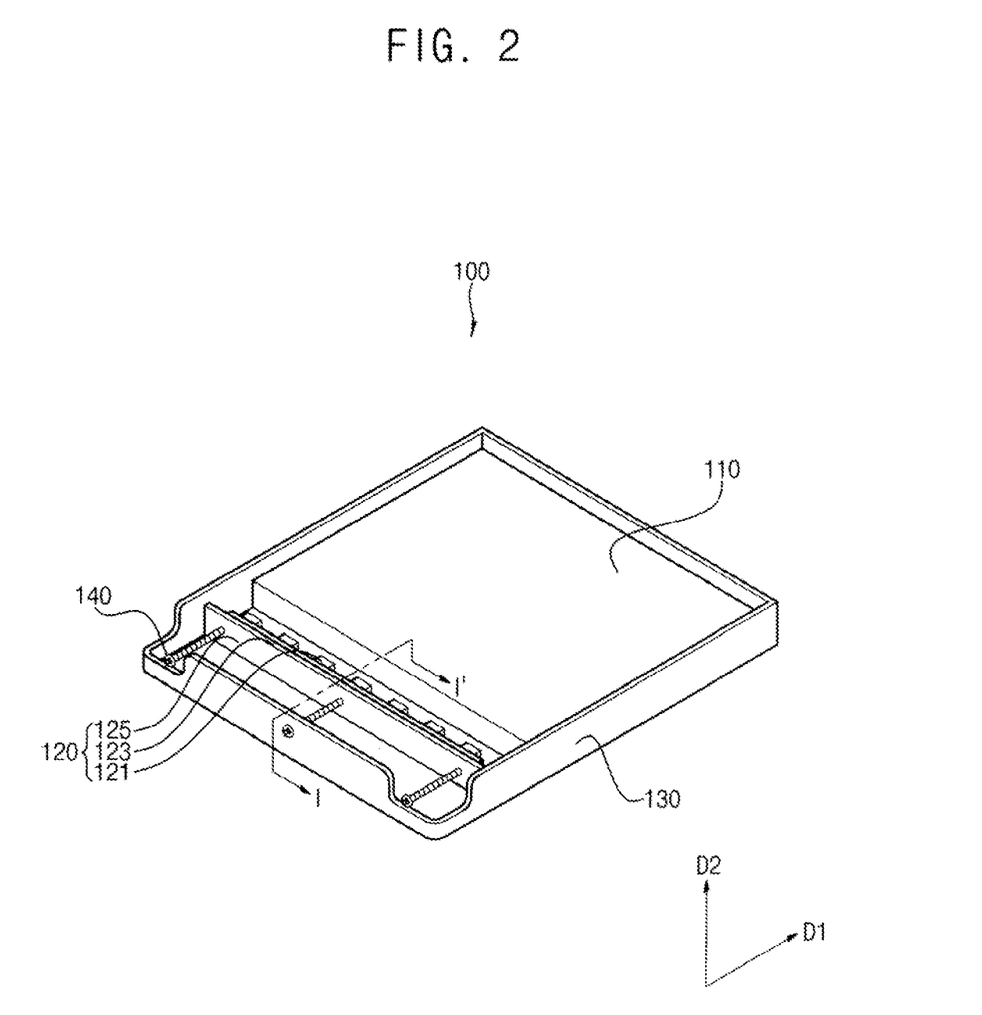
FIG. 2 is a perspective view illustrating a backlight assembly of FIG. 1.
Figure 3:
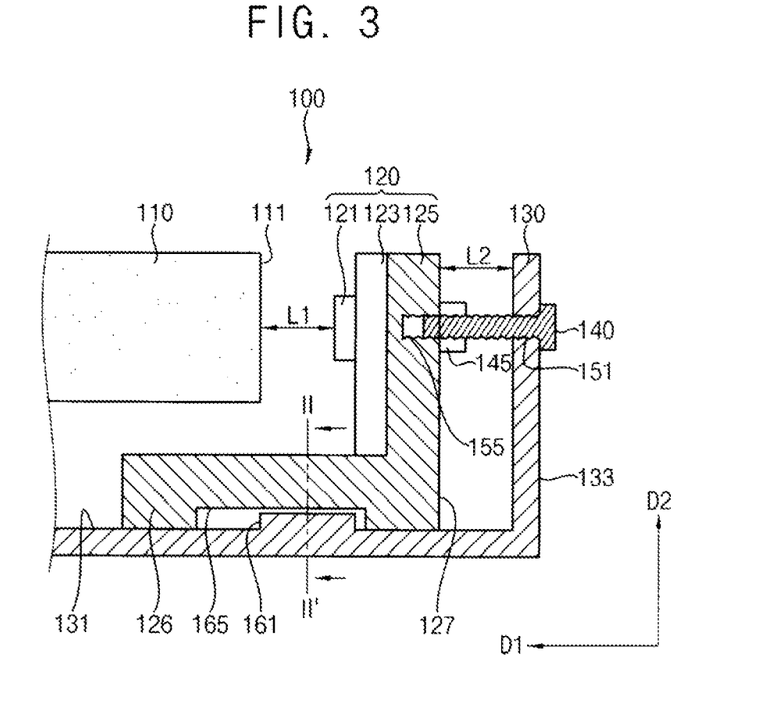
FIG. 3 is a cross-sectional view taken along a line I-I' of FIG. 2.
Figure 4:
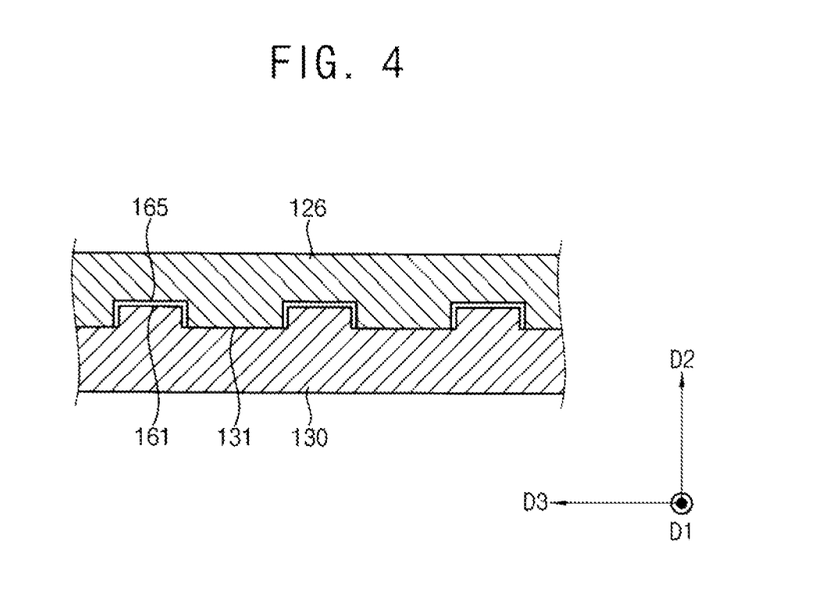
FIG. 4 is a cross-sectional view taken along a line II-II' of FIG. 3.

FIG. 2 is a perspective view illustrating a backlight assembly of FIG. 1. FIG. 3 is a cross-sectional view taken along a line I-I' of FIG. 2. FIG. 4 is a cross-sectional view taken along a line II-IF of FIG. 3.

Referring to FIGS. 2, 3 and 4, the light source module 120 includes a plurality of light sources 121 facing the light incident side surface 111 (sidewall) of the light guide plate 110. The light sources 121 are disposed adjacent to the incident surface 111 of the light guide plate 110 by a regular interval, and are spaced apart from the incident surface 111 by a first gap L1 (see FIG. 3). For example, the first gap L1 may be pre-specified to optimally be in a range of between about 0.5 mm and about 0.7 mm. The light sources 121 may include a plurality of light emitting diodes (LEDs) which are configured to generate white or R, G, B light using respective semiconductor characteristics and electric current supplied from an external driving power source. Each LED generates a one-way directional light that may be considered as a point type light source. For example, the LED generates the light approximately spreading from an arbitrary point.

Among the possibilities, the light sources 121 may include at least one of red LEDs emitting red light, at least one of green LEDs emitting green light, and at least one of blue LEDs emitting blue light. The red, green and blue light respectively emitted from the red LED, green LED, blue LED are mixed with each other, and are provided to the light guide plate 110 as white light.

In addition, the light source module 120 may further include a light source supporting substrate 123 and an extrusion bar 125 (e.g., an extruded metal bar having extruded and/or die-stamped frame sections).

The light sources 121 are mounted on a first surface of the light source supporting substrate 123 facing the incident sidewall surface 111 of the light guide plate 110. The light source supporting substrate 123 may have a bar or plate shape. In one embodiment, the light source supporting substrate 123 may be a printed circuit board (PCB) that is configured for driving the LEDs, wherein circuit patterns that electrically connect to the light sources 121 are integrally formed on the PCB for apply respective driving currents to the light sources 121. For example, the PCB for driving the LED may include a base substrate, a circuit pattern made with conductive material patterned to apply driving currents to the plurality of LEDs disposed on the base substrate, and an insulating layer provided for preventing electrically shorting from occurring between the circuit patterns. The base substrate may be formed as a rigid plate or a flexible film according to the thickness and ductility of the base substrate.

The extrusion bar 125 includes a first frame section 126 extending along a first direction D1 so as to be substantially parallel with the bottom surface 131 of the receiving container 130. The extrusion bar 125 further includes a second section frame section 127 extending from the first frame section and along a second direction D2 substantially perpendicular to the first direction D1. The light source supporting substrate 123 is disposed on the second frame section 127. Here, the light source supporting substrate 123 and the second frame section 127 of the extrusion bar 125 are fixed to each other by an adhesive member (not shown) such as an adhesive tape.

The extrusion bar 125 may include an extruded and die-stamped metal plate made with thermally conductive material such as copper (Cu) or aluminum (Al) or alloys thereof which materials provide good thermal conductivity for conducting heat generated from the light sources 121 to outside and which materials also provide good workability and post work rigidity, including an ability to be extruded and shaped by stamping or otherwise for purpose of low cost mass production. For example, the light source supporting substrate 123 is supported by the extrusion bar 125 efficiently emitting the heat generated from the light sources 121. Here, mechanical stability of the light source module 120 may be maintained by the extrusion bar 125.

The receiving container 130 receives the light guide plate 110 and the light source module 120, and includes the bottom surface 131 and sidewall 133 extending from the bottom surface 131 along the second direction D2. The receiving container 130 has a shape which is a rectangular hoop opening an upper surface area thereof For example, according to the bottom surface 131, and sidewall 133 covering a receiving space of the receiving container 130, the receiving container 130 is shaped as a "U-like" shape in a side view. The receiving space formed by the bottom surface 131 and sidewall 133, has a height substantially same as a height with which the light guide plate 110 and light source module 120 are loaded.

The gap adjusting elements 140 are combined with the sidewall 133 of the receiving container 130 and the light source module 120, and they adjustably control a spacing apart configuration that causes the sidewall 133 of the receiving container 130 and the light source module 120 to be spaced apart from each other. Here, the light source module 120 is spaced apart from the sidewall 133 of the receiving container 130 by a second gap of respective length L2. Although due to drawing choice, the gap adjusting elements 140 are drawn in FIG. 2 as if each abuts into the back of a respective LED 121, such is not necessary and in other embodiments the gap adjusting elements 140 are disposed so as to be interposed between LEDs 121. Additionally, and although not specifically shown in the drawings, in one embodiment, when the gap adjusting element 140 is a threaded screw, the threading does not continue all the way clockwise from the tail to the head end of the screw shaft but rather has one or more discontinuities in the threading whereby turning of the screw does not advance it within threaded receiving hole 151 (a.k.a. herein as first combining hole 151) while the same turning does advance the screw shaft into a second threaded receiving hole 155 (a.k.a. herein as second combining hole or combining groove 155). The discontinuity may be in the form of no thread on the screw shaft or an oppositely winding thread (e.g., counterclockwise) in certain places along the shaft length. Accordingly advancement rate of the screw shaft (not shown in detail) into the second threaded receiving hole 155 (combining groove 155) is at times different than advancement rate of the screw shaft (not shown in detail) into the first threaded receiving hole 151. In an alternate embodiment, the screw shaft has a comparatively smaller diameter at its tail end (the end that screws into a similarly dimensioned second threaded receiving hole 155 and a comparatively larger diameter at its head end (the end near the head, which shaft end screws into a similarly dimensioned first threaded receiving hole 151) and where the advancement pitch of the head end threads (e.g., of hole 151) is finer (smaller) than that of the tail end threads (e.g., of hole 155) so that when turned in a tightening direction, the dual diameter screw advances faster into the tail end hole (155) than it does into the head end hole (151). In other words, the rates of screw advancement are different at the tail and head ends. In yet another embodiment, the disposition of the fine and coarse pitched threads is reversed so that, the advancement pitch of the head end threads (e.g., of hole 151) is coarser (larger) than that of the tail end threads (e.g., of hole 155) so that when turned in a tightening direction, the dual diameter screw advances slower into the finer pitched tail end hole (155) than it does into the coarse pitched head end hole (151).

For example, the gap adjusting element 140 penetrates a combining hole 151 formed through the sidewall 133 of the receiving container 130, and one end portion of the gap adjusting element 140 is screwed into a combining groove 155 formed on the light source module 120. Accordingly, the first gap of respective length L1 is determined according to a degree of actuation (screwing, turning or other such adjustment) of the gap adjusting element 140 (e.g., differentially pitched screw shaft). Here, for example, the gap adjusting element 140 may be a screw with a differentially pitched helical thread. For example, when turning the screw of the gap adjusting element 140 in a tightening direction (e.g., clockwise), the second gap L2 is decreased and the first gap L1 is increased. Alternatively, when loosening the screw of the gap adjusting element 140 (e.g., by turning counterclockwise), the second gap L2 is increased and the first gap L1 is decreased. While the disclosure generally refers to a single instance of the L1 and L2 spacing apart distances, it is within the contemplation of the present disclosure that each adjusting element 140 establishes its own respective set of L1 and L2 spacing apart distances such that the L1 and L2 spacing apart distances at one position along the light source module 120 need not be exactly the same as those at another position along the light source module 120.

The combining hole 151 which the gap adjusting element 140 penetrates through is formed through the sidewall 133 of the receiving container 130. The combining groove 155 into which the one end portion of the gap adjusting element 140 is screw-wise mated with is formed in the extrusion bar 125 of the light source module 120. For example, the light source supporting substrate 123 is fixed to a first surface of the second frame section 127, and the combining groove 155 is formed on a second surface of the second frame section 127 opposing to the first surface of the second frame section 127. Accordingly, when turned, the gap adjusting element 140 moves the second frame section 127 of the extrusion bar 125 relative to the sidewall 133 of the receiving container 130 and along the first direction D1.

As shown in FIG. 3, the combining groove 155 is formed to alignably correspond to the combining hole 151, and in one embodiment, a screw thread is formed on each of inside surfaces of the combining hole 151 and the combining groove 155. The gap adjusting element 140 is inserted into the combining hole 151 first and to a pre-specified first distance and then the gap adjusting element 140 is additionally inserted into the combining groove 155 and turned a further distance so as thereby combine the receiving container 130 with the light source module 120 while establishing one or more desired spacing apart gaps. For example, the gap adjusting element 140 may adjust the first gap L1 according to the degree that the gap adjusting element 140 is screwed first into the combining hole 151 and thereafter also into the combining groove 155.

According to the present example embodiment, the gap adjusting element 140 is a male screw shaped as a column, and the combining hole 151 and the combining groove 155 are female screws (threaded holes) corresponding to the male screw to be penetrated by and to be combined with the male screw. However, the gap adjusting element 140, the combining hole 151 and the combining groove 155 are not to be construed as limited to the above-mentioned example embodiment and may be modified in various so as to achieve similar results. In addition, the gap adjusting element 140, the combining hole 151 and the combining groove 155 may be plural in number. For example, each one of the gap adjusting elements 140, the corresponding combining holes 151 and the corresponding combining grooves 155 may be formed on each end portion of both sides of the backlight assembly 100. In addition, a self-locking portion 145 (e.g., lock nut and/or a threads locking fluid) with which the gap adjusting element 140 penetrates to be combined, may be further included. The self-locking portion 145 is activated after a desired L1/L2 configuration is attained so as to thereby fix the gap adjusting element 140 with the combining groove 155.

Accordingly, although a preconditioning optimal gap between the light guide plate and the receiving container may not be maintained when an error occurs in manufacturing and assembling the backlight assembly, the gap between the light source and the light guide plate may be re-adjusted using the gap adjusting elements 140. Accordingly, display quality may be prevented from being deteriorated, and the productivity may be increased.

A sliding guide bar 161 is formed, in one embodiment, on the bottom surface 131 of the receiving container 130, and a sliding groove 165 formed on the first frame section 126 of the extrusion bar 125 as will be explained below in detail with reference to FIGS. 3 and 4.

Referring to FIGS. 3 and 4, the sliding guide bar 161 is disposed on the bottom surface 131 of the receiving container 130, and guides the extrusion bar 125 to move along the first direction D1. The sliding groove 165 is disposed on the first frame section 126 of the extrusion bar 125, and mates with the sliding guide bar 161 so as to cooperate in combination with the sliding guide bar 161 for guiding movement of the extrusion bar 125 when the gap adjusting elements 140 are adjusted. Each length and width of the sliding guide bar 161 and the sliding groove 165 may be configured as optimal relations, taking into account a vacant space between the sliding guide bar 161 and the sliding groove 165, and taking into account thermal expansion and contraction of the receiving container 130 and the extrusion bar 125.

According to the present example embodiment, the sliding guide bar 161 and the sliding groove 165 are shaped as bar shapes substantially parallel with the bottom surface 131 of the receiving container 130, and are shaped as a rectangular, when viewed in a cross-section. In addition, the sliding guide bar 161 and the sliding groove 165 may be plural along a third direction D3 substantially perpendicular to the first and second directions D1 and D2.

Figure 5:
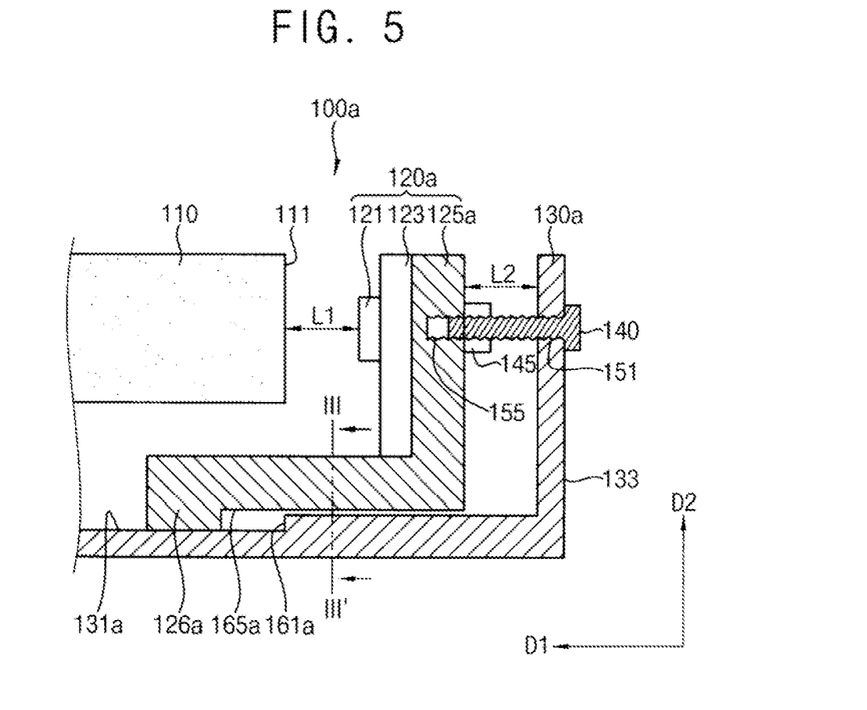
FIG. 5 is a cross-sectional view illustrating a backlight assembly according to another example embodiment.
Figure 6:
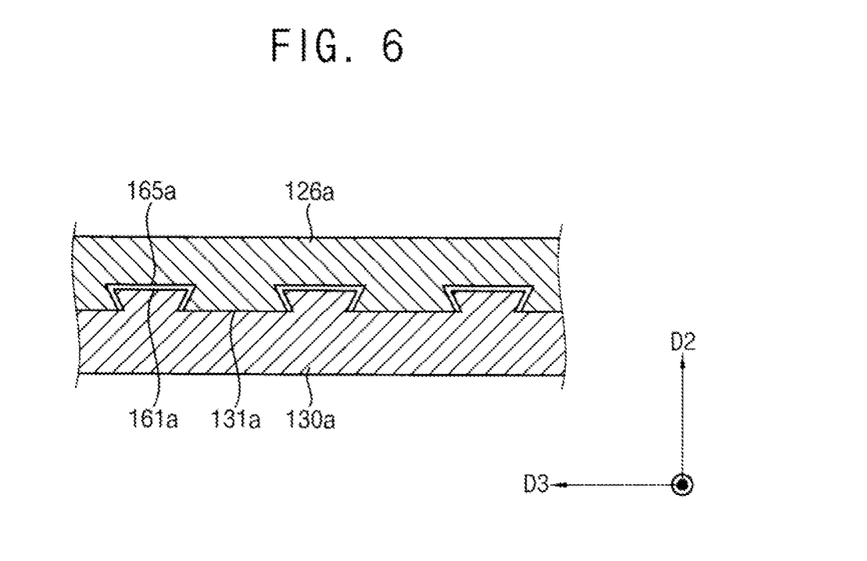
FIG. 6 is a cross-sectional view taken along a line III-III' of FIG. 5.

FIG. 5 is a cross-sectional view illustrating a backlight assembly according to another example embodiment. FIG. 6 is a cross-sectional view taken along a line III-III' of FIG. 5.

According to the present example embodiment, a backlight assembly 100a is substantially same as the backlight assembly 100 of FIG. 3, except for the sliding guide bar 161 and the sliding groove 165. Accordingly, the same reference numerals will be used to refer to the same or like parts as the backlight assembly 100 shown in FIG. 3 and any further repetitive explanation concerning the same or like parts will be omitted.

Referring to FIGS. 5 and 6, a self-retained sliding guide bar 161a is formed such that an upper surface of the sliding guide bar 161a is larger than a bottom portion of the sliding guide bar 161a to thus define an inverted trapezoid or other such self-retained geometric shape that can slide in the D1 direction. In the illustrated example an area of the sliding groove 165a increases as a depth of the sliding groove 165a increases. For example, the sliding guide bar 161a and the sliding groove 165a are shaped as the illustrated trapezoid, which means that bottom sides of the sliding guide bar 161a and the sliding groove 165a are shorter than upper sides thereof, when viewed in a cross-section. For example, the sliding guide bar 161 a is formed to extend from a certain point of the bottom surface 131a of the receiving container 130a to the sidewall 133, and guides the extrusion bar 125a to move along the first direction D1. The sliding groove 165a is disposed on the first frame section 126a of the extrusion bar 125a, and makes the sliding guide bar 161a to move in combination with the sliding guide bar 161a. A light source module 120a including the extrusion bar 125a is assembled to be inserted into the sliding guide bar 161a in parallel from a starting point at which the sliding guide bar starts to be formed.

The sliding guide bar 161a is formed such that an upper surface of the sliding guide bar 161a is larger than a bottom surface of the sliding guide bar 161a, and an area of the sliding guide bar 161a decreases as a depth of the sliding guide bar 161a increases. Accordingly, the extrusion bar 125a may move along a direction substantially parallel with the sliding guide bar 161a, but the extrusion bar 125a may not move along a direction substantially perpendicular to the sliding guide bar 161a.

As an example of a sliding guide bar and a sliding groove, a latch portion (not shown) may be formed on the bottom surface 131 of the receiving container 130, and a depression portion (not shown) corresponding to the latch portion may be formed on the first frame section 126 of the extrusion bar 125. Accordingly, a range of moving the light source module 120 is restricted by the latch portion (not shown).

Thus, the sliding guide bar and the sliding groove according to the present example embodiments, a movement of the light source module is restricted in all other directions except for the L1/L2 adjusting moving direction of the light source module. The sliding guide bar and the sliding groove are not to be construed as limited to the above-mentioned example embodiment and may be modified in various ways to achieve substantially similar results.

Figure 7:
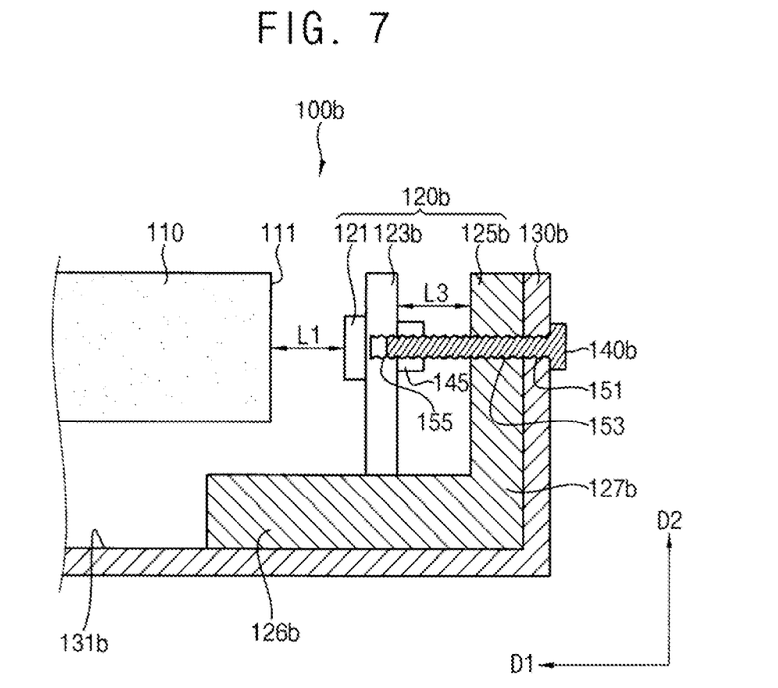
FIG. 7 is a cross-sectional view illustrating a backlight assembly according to still another example embodiment.

FIG. 7 is a cross-sectional view illustrating a backlight assembly according to still another example embodiment.

According to the present example embodiment, a backlight assembly 100b is substantially same as the backlight assembly 100 of FIG. 3, except for a second combining hole 153 formed on the second frame section 127 of the extrusion bar 125 and a combining groove 155 formed on the light source supporting substrate 123. Accordingly, the same reference numerals will be used to refer to the same or like parts as the backlight assembly 100 shown in FIG. 3 and any further repetitive explanation concerning the same or like parts will be omitted.

Referring to FIG. 7, the second combining hole 153 is formed in a second frame section 127b of an extrusion bar 125b, and the combining groove 155 into which the one end portion of the gap adjusting element 140 is screwed is formed on a light source supporting substrate 123b of a light source module 120b.

For example, during manufacture, the extrusion bar 125b is fixed to the bottom surface 131 of the receiving container 130, and the second combining hole 153 corresponding to the first combining hole 151 is alignably formed through the sidewall 133 of the receiving container 130 and is further formed through the second frame section 127b of the extrusion bar 125b. In addition, the combining groove 155 is formed on a second surface opposite to a first surface on which the light sources 121 of the light source supporting substrate 123b are disposed.

The gap adjusting element 140 penetrates the first and second combining holes 151 and 153 while the second frame section 127b is held together with the sidewall 130b of the receiving container 130, and is thereafter screwed into the combining groove 155, so that the gap adjusting element 140 moves the light source supporting substrate 123b from the second frame section 127b along the first direction D1. Here, the light source supporting substrate 123b and the second frame section 127b are spaced apart from each other by a third gap of respective length L3. For example, when tightening the screw of the gap adjusting element 140, the third gap L3 is decreased and the first gap L1 is increased. Alternatively, when loosening the screw of the gap adjusting element 140, the third gap L3 is increased and the first gap L1 is decreased.

Figure 8:
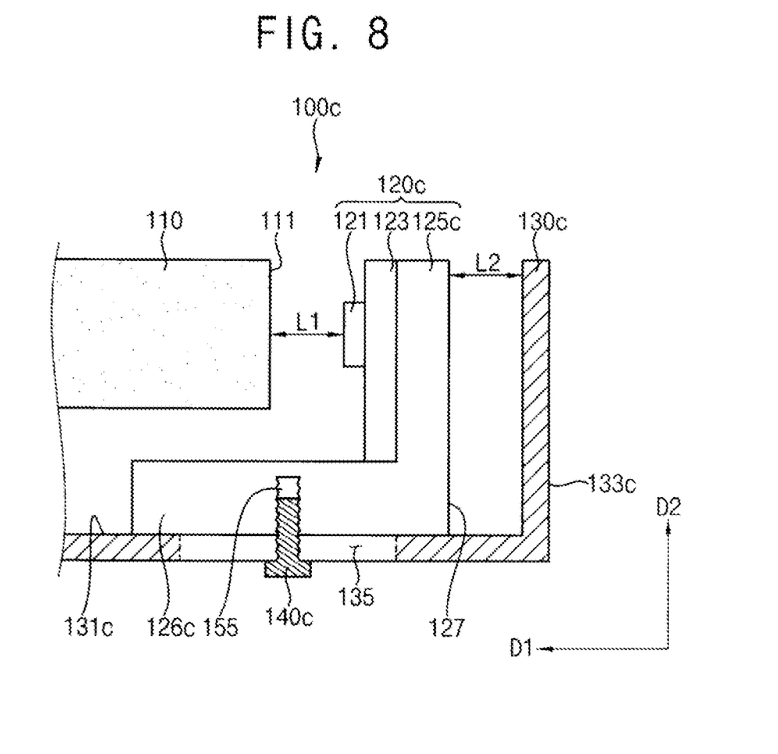
FIG. 8 is a cross-sectional view illustrating a backlight assembly according to still another example embodiment.
Figure 9:
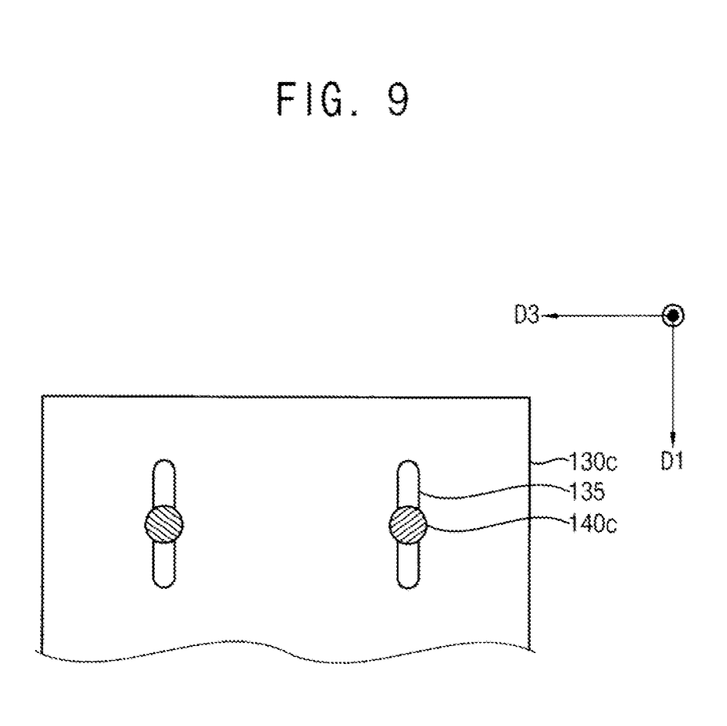
FIG. 9 is a bottom view illustrating a bottom surface of the backlight assembly of FIG. 8.

FIG. 8 is a cross-sectional view illustrating a backlight assembly according to still another example embodiment. FIG. 9 is a bottom view illustrating a bottom surface of the backlight assembly of FIG. 8. (Although not shown, the concept of FIG. 8 may be provided in combination with those of any of FIGS. 1-7 where screw 140c and slot 135 provide movement guidance and/or a gap length locking function.)

According to the present example embodiment of FIGS. 8-9, a backlight assembly 100c may include a light guide plate 110, a light source module 120c, a receiving container 130c and a combining element 140c. The backlight assembly 100c is substantially same as the backlight assembly 100 of FIG. 3, except that the backlight assembly 100c does not include the gap adjusting element, but includes the combining element 140c. Accordingly, the same reference numerals will be used to refer to the same or like parts as the backlight assembly 100 shown in FIG. 3 and any further repetitive explanation concerning the same or like parts will be omitted.

The combining element 140c is combined with a bottom surface 131c of the receiving container 130c and the light source module 120c, and adjusts a position of the light source module 120c on the bottom surface 131c of the receiving container 130c, so that the combining element 140c may be temporarily loosened to adjust a gap between the light source module 120c and the light guide plate 110 and thereafter re-tightened.

In addition, a penetration line 135 (e.g., linear slot) through which the combining element 140c penetrates is formed through the bottom surface 131c of the receiving container 130c, and a combining groove 155 into which the combining element 140c is screwed is formed on a bottom surface 126c of the light source module 120c corresponding to the bottom surface 131c. The penetration line 135 of the illustrated embodiment has a bar-like shape extending along the first direction substantially parallel with the bottom surface of the receiving container, so that the gap between the light source module 120c and the light guide plate 110c is adjusted according as the combining element 140c moves along the penetration line combined with the light source module 120c.

According to the details described above, even if a preset optimal gap distance between the light guide plate and the receiving container may not be maintained due to an error occurring in manufacturing and assembling the backlight assembly, the gap may be further adjusted using a gap adjusting element. Accordingly, a display quality may be prevented from being decreased, and the productivity may be enhanced.

The foregoing is illustrative of the present disclosure of invention and is not to be construed as limiting thereof Although a few example embodiments in accordance with the present disclosure of invention have been described, those skilled in the art will readily appreciate that many modifications are possible in the example embodiments without materially departing from the novel teachings and advantages of the present disclosure.

More specifically, although the illustrated examples show a gap adjusting element having just one male screw section, it is within the contemplation of the present disclosure to have two or more co-axial male screw sections cooperatively inter-coupled with an interposed female screw section where the female screw section (coupling nut) can be turned so as to adjust a spacing apart distance between adjacent ends of the co-axial male screw sections. The exterior of the female screw section (coupling nut) may be hexagonal or otherwise for receiving a corresponding wrench or other turning tool. Accordingly, all such variations and modifications are intended to be included within the scope of the present disclosure.

What is claimed is:

1. A backlight assembly comprising:
  a light guide plate comprising an incident surface into which a sourced external light is to be applied;
  a light source module comprising a plurality of light sources facing the incident surface of the light guide plate, the light source module being spaced apart from the incident surface by at least a first gap distance;
  a receiving container comprising a bottom surface and a sidewall extending from the bottom surface to form a receiving space, the receiving space receiving the light guide plate and the light source module; and
  a gap adjusting element operatively inter-coupled between the receiving container and the light source module, the inter-coupling being an adjustable one that can be actuated to adjust at least the spacing apart first gap distance between the light source module and the light guide plate, and
  wherein a combining groove is formed on the light source module and a combining hole is formed through the sidewall of the receiving container, and
  the gap adjusting element is operatively combined with the combining groove and the combining hole such that the gap adjusting element can differentially advance in at least one of the combining groove and the combining hole relative to advancement in the other when the gap adjusting element is turned in a pre-specified direction.

2. The backlight assembly of claim 1, wherein the light source module further comprises:
  a light source supporting substrate mounting the light sources, and facing the incident surface of the light guide plate; and
  an extrusion bar comprising first and second frame sections, the first frame section being formed along a first direction substantially parallel with the bottom surface of the receiving container, the second frame section extending from the first frame section along a second direction substantially perpendicular to the first direction.

3. The backlight assembly of claim 2, wherein the light source supporting substrate is disposed on the second frame section.

4. The backlight assembly of claim 3, further comprising:
  an adjustment locking portion structured to fix an adjustment function of the gap adjusting element and thereby lock into place a respective gap length established by the gap adjusting element 5. The backlight assembly of claim 3, wherein the light source supporting substrate is fixed to a first surface of the second frame section and the combining groove is formed on a second surface of the second frame section opposite to the first surface of the second frame section, so that the second frame section moves from the sidewall of the receiving container along the first direction as a function of screwed orientation between the gap adjusting element and the combining groove.

6. The backlight assembly of claim 5, wherein
  the light sources and the incident surface of the light guide plate are spaced apart from each other by a first gap (L1), and the light source module and the sidewall of the receiving container are spaced apart from each other by a second gap (L2), and
  the first gap increases as the second gap decreases and vice versa due to the screwed orientation.

7. The backlight assembly of claim 3, wherein
  a sliding guide bar is formed on the bottom surface of the receiving container to guide the extrusion bar to move along the first direction, and
  a sliding groove into which the sliding guide bar is inserted is formed on the first frame section of the extrusion bar.

8. The backlight assembly of claim 7, wherein
  an upper surface of the sliding guide bar is larger than a lower portion of the sliding guide bar, and an area of the sliding groove increases as a depth of the sliding groove increases.

9. The backlight assembly of claim 7, wherein each of the sliding guide bar and the sliding groove is plural in number along a third direction substantially perpendicular to the first and second directions.

10. The backlight assembly of claim 2, wherein the light source supporting substrate and the second frame section are spaced apart from each other.

11. The backlight assembly of claim 10, wherein the second frame section of the extrusion bar is fixed to the sidewall of the receiving container.

12. The backlight assembly of claim 11, wherein a first combining hole is formed through the sidewall of the receiving container, a second combining hole is formed through the second frame section of the extrusion bar, and the combining groove is formed on the light source supporting substrate, so that the gap adjusting element is combined with the first and second combining holes and the combining groove.

13. The backlight assembly of claim 12, wherein the light sources are fixed to a first surface of the light source supporting substrate, the combining groove is formed on a second surface of the light source supporting substrate opposite to the first surface of the light source supporting substrate, so that the light source supporting substrate moves from the second frame section of the extrusion bar along the first direction as a function of screwed orientation between the gap adjusting element and the combining groove.

14. The backlight assembly of claim 12, wherein
the light sources and the incident surface of the light guide plate are spaced apart from each other by a first gap (L1), the light source supporting substrate and the second frame section of the extrusion bar are spaced apart from each other by a third gap (L3), and
the first gap increases as the third gap decreases and vice versa due to the screwed orientation.

15. A backlight assembly comprising:
a light guide plate comprising an incident surface into which a light is incident;
a light source module comprising a plurality of light sources facing the incident surface of the light guide plate;
a receiving container comprising a b face and a sidewall extending from the bottom surface to form a receiving space, the receiving space receiving the light guide plate and the light source module; and
a combining element combined with the bottom surface of the receiving container and the light source module, the combining element being actuatable to adjust a position of the light source module along the bottom surface of the receiving container so as to thereby adjust a gap distance between the light source module and the light guide plate, and
wherein a penetration line through which the combining element penetrates is formed through the bottom surface of the receiving container, and
a combining groove into which the combining element is screwed is formed on a bottom surface of the light source module corresponding to the bottom surface of the receiving container, and
wherein the penetration line has a bar-like shape extending along the first direction substantially parallel with the bottom surface of the receivinu container, so that the gap between the light source module and the light guide plate is adjusted according as the combining element moves along the penetration line combined with the light source module.

* * * * *